(12) United States Patent
Kanata et al.

(10) Patent No.: US 12,275,342 B2
(45) Date of Patent: Apr. 15, 2025

(54) AUTOMATIC TRAVELING CART

(71) Applicant: TOYOTA JIDOSHA KABUSHIKI KAISHA, Toyota (JP)

(72) Inventors: Tetsuya Kanata, Susono (JP); Yozo Iwami, Susono (JP); Yuhei Katsumata, Fuji (JP); Daisaku Honda, Nagoya (JP); Saki Narita, Toyota (JP); Hideki Fukudome, Toyota (JP); Takuya Watabe, Hachioji (JP); Naoko Ichikawa, Shibuya-ku Tokyo-to (JP); Yuta Maniwa, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 695 days.

(21) Appl. No.: 17/523,394

(22) Filed: Nov. 10, 2021

(65) Prior Publication Data
US 2022/0153180 A1  May 19, 2022

(30) Foreign Application Priority Data
Nov. 16, 2020 (JP) .................. 2020-190430

(51) Int. Cl.
*B60P 3/06* (2006.01)
*A61G 5/00* (2006.01)
*A61G 5/04* (2013.01)
*B62D 63/04* (2006.01)

(52) U.S. Cl.
CPC ............... *B60P 3/06* (2013.01); *A61G 5/003* (2013.01); *A61G 5/047* (2013.01); *B62D 63/04* (2013.01)

(58) Field of Classification Search
CPC .......... B60P 3/06; A61G 5/047; A61G 5/003; A61G 5/04; A61G 5/1051; A61G 2203/22; B62D 63/025; B62D 63/04
See application file for complete search history.

(56) References Cited

U.S. PATENT DOCUMENTS

| | | | |
|---|---|---|---|
| 5,050,695 A * | 9/1991 | Kleinwolterink, Jr. | A61G 5/1051 180/907 |
| 5,725,231 A * | 3/1998 | Buie | B60D 1/247 280/484 |
| 5,826,670 A * | 10/1998 | Nan | A61G 5/1051 180/211 |
| 7,216,728 B2 * | 5/2007 | Huang | A61G 5/1051 180/13 |
| 8,684,113 B1 * | 4/2014 | Laconis | A61G 5/047 180/11 |
| 10,751,232 B1 * | 8/2020 | Ilao | A61G 5/1051 |

(Continued)

FOREIGN PATENT DOCUMENTS

| | | |
|---|---|---|
| JP | 2002-165843 A | 6/2002 |
| JP | 3116351 U | 12/2005 |

(Continued)

*Primary Examiner* — Kevin Hurley
*Assistant Examiner* — Marlon A Arce
(74) *Attorney, Agent, or Firm* — Dinsmore & Shohl LLP (57) ABSTRACT

An automatic traveling cart includes a connecting arm that connects a wheelchair to a front portion or a rear portion of the automatic traveling cart. The automatic traveling cart transports the wheelchair while a user is placed on the wheelchair without intentionally placing the wheelchair on the cart.

8 Claims, 11 Drawing Sheets

(56) References Cited

U.S. PATENT DOCUMENTS

| | | | |
|---|---|---|---|
| 10,888,474 B2* | 1/2021 | Kim | A61G 5/047 |
| 11,065,166 B2* | 7/2021 | Richter | A61G 5/047 |
| 2006/0037788 A1* | 2/2006 | Madwed | A61G 5/045 |
| | | | 180/6.48 |
| 2007/0289787 A1* | 12/2007 | Wiff | B62B 5/0026 |
| | | | 180/16 |
| 2008/0223649 A1* | 9/2008 | Wandeler | A61G 5/047 |
| | | | 180/333 |
| 2010/0038154 A1 | 2/2010 | March et al. | |
| 2017/0020753 A1* | 1/2017 | Boretto | A61G 5/08 |
| 2019/0151185 A1* | 5/2019 | Kirschey | A61G 5/047 |
| 2021/0139098 A1* | 5/2021 | Carrasco Vergara | B62K 11/02 |

FOREIGN PATENT DOCUMENTS

| | | | |
|---|---|---|---|
| JP | 2009-284944 A | 12/2009 |
| JP | 2010-503429 A | 2/2010 |
| JP | 2012-030735 A | 2/2012 |
| JP | 2013-041527 A | 2/2013 |
| WO | 2008/031155 A1 | 3/2008 |

* cited by examiner

Front Connection Mode
(Outer Wheel Deference Mode)

Fig. 10

**Rear Connection Mode
(Inner Wheel Deference Mode)**

Fig. 11

AUTOMATIC TRAVELING CART

CROSS-REFERENCE TO RELATED APPLICATIONS

The present application claims priority under 35 U.S.C. § 119 to Japanese Patent Application No. 2020-190430, filed Nov. 16, 2020, of which the contents are incorporated herein by reference in their entirety.

BACKGROUND

Technical Field

The present disclosure relates to an automatic traveling cart, and more particularly to an automatic traveling cart capable of carrying a person and a wheelchair together.

Background Art

JP-A-2009-284944 discloses an electric bogie in which a wheelchair can be mounted while a person is placed on the wheelchair. The electric bogie disclosed in JP-A-2009-284944 is used not only for mounting a wheelchair, but also for conveying a load and moving a person.

SUMMARY

According to the prior art described above, the wheelchair user can move freely without the need for an attendant. In addition, since it is not necessary to push the wheelchair, the burden on the attendant can be reduced. However, the electric bogie disclosed in the prior art has a specification for entering under the wheelchair so as to place the driving wheels of the wheelchair on the bogie. Therefore, the size of the electric bogie is limited. In addition, since the wheelchair needs to ride on the electric bogie, it may be troublesome for the user of the wheelchair.

The present disclosure has been made in view of the above-mentioned problems, and an object of the present disclosure is to provide an automatic traveling cart capable of transporting a wheelchair with a user while the user is placed on the wheelchair without intentionally placing the wheelchair on the cart.

The automatic traveling cart according to the present disclosure is an automatic traveling cart comprising a connecting arm for connecting a wheelchair to a front portion or a rear portion of the automatic traveling cart. The connecting arm may allow a change in a vertical position of the wheelchair with respect to the automatic traveling cart.

When a wheelchair is coupled to an automatic traveling cart by a connecting arm, the automatic traveling cart may have a larger turning radius than when the wheelchair is not coupled to the automatic traveling cart.

The connecting arm may couple the wheelchair to the front of the automatic traveling cart with the wheelchair directed in the direction of travel of the automatic traveling cart. In this case, the automatic traveling cart may change the traveling track so that the outer rear wheels draw the track more outward than the outer front wheels.

The connecting arm may couple the wheelchair to the rear of the automatic traveling cart with the wheelchair directed in the direction of travel of the automatic traveling cart. In this case, the traveling track may be changed so that the inner rear wheel of the automatic traveling cart draws the track more inward than the inner front wheel.

According to the present disclosure, since the automatic traveling cart and the wheelchair are connected by the connecting arm, it is possible to carry the wheelchair with the user while the user is placed on the wheelchair without intentionally placing the wheelchair on the cart.

DETAILED DESCRIPTION

In each of the embodiments described below, the same reference numerals are assigned to elements common to the respective drawings, and duplicate descriptions are omitted or simplified. In addition, in the following embodiments, the present disclosure is not limited to the number referred to, except in the case of referring to the number of each element, the number, the quantity, the range, and the like, in particular, in the case of specifying the number, or in the case of clearly specifying the number in principle.

Figure 1:
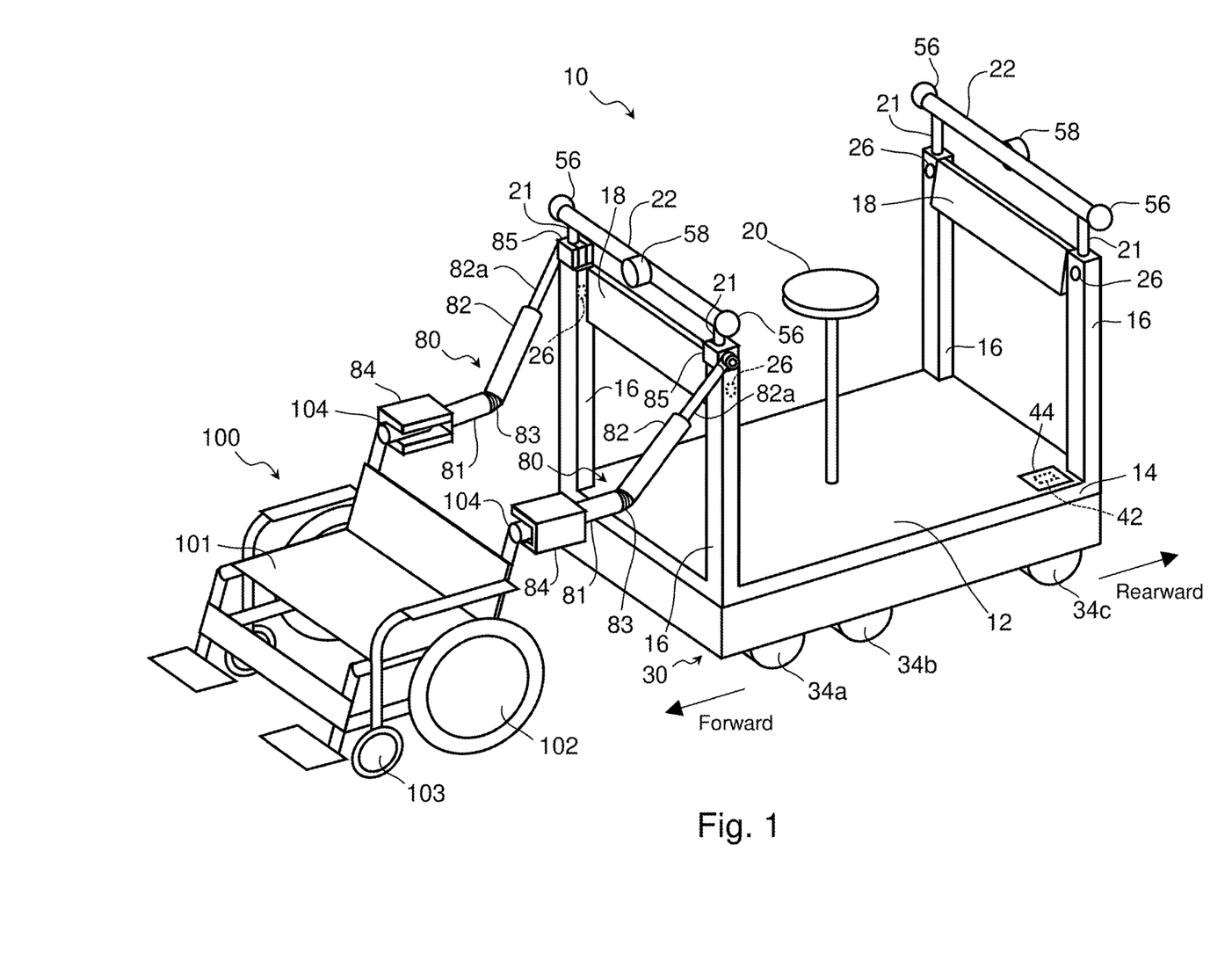
FIG. 1 is a perspective view showing a state in which the wheelchair is connected to a front of an automatic traveling cart according to an embodiment of the present disclosure.
Figure 2:
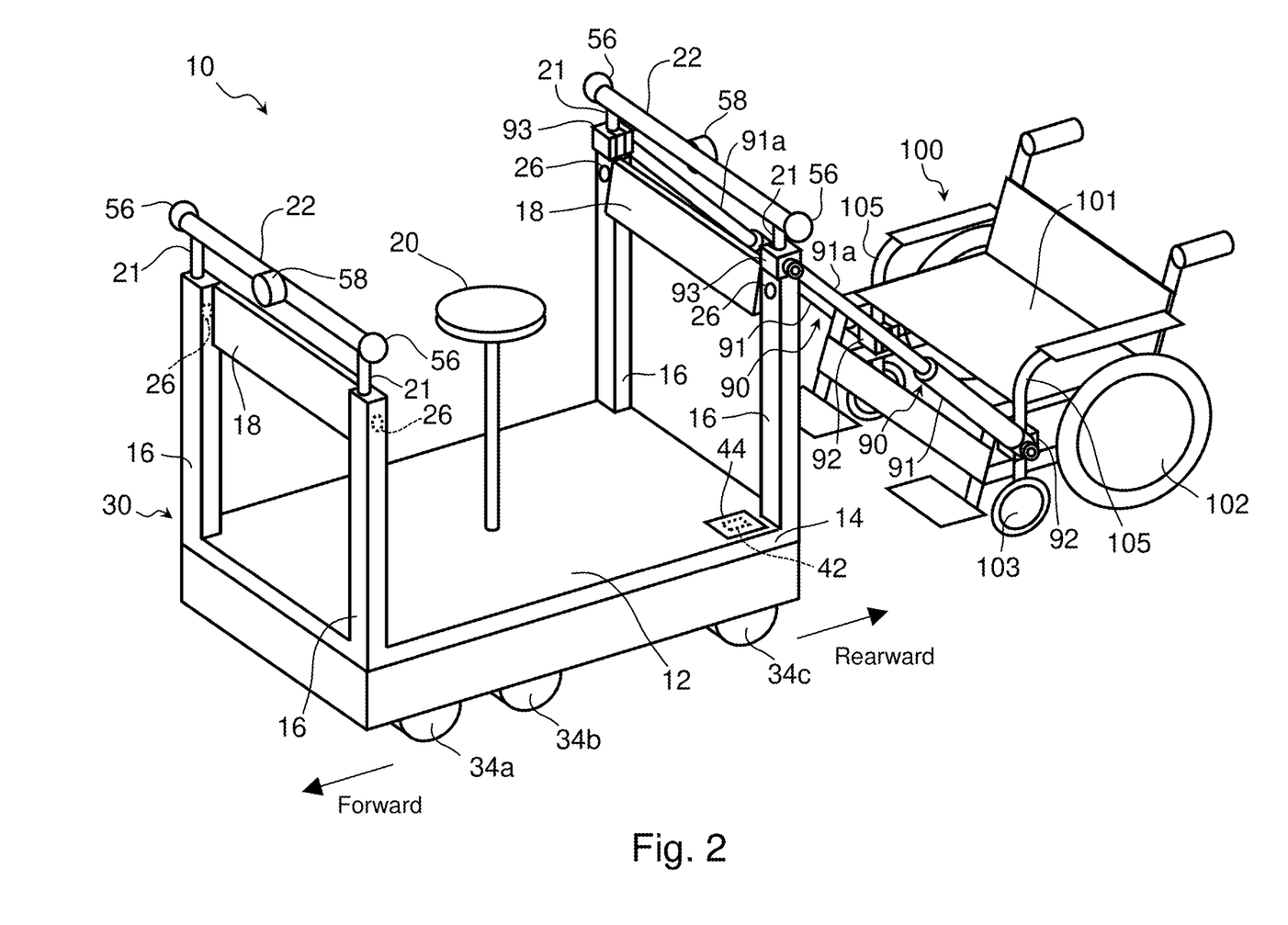
FIG. 2 is a perspective view showing a state in which the wheelchair is connected to a rear of the automatic traveling cart according to an embodiment of the present disclosure.
Figure 3:
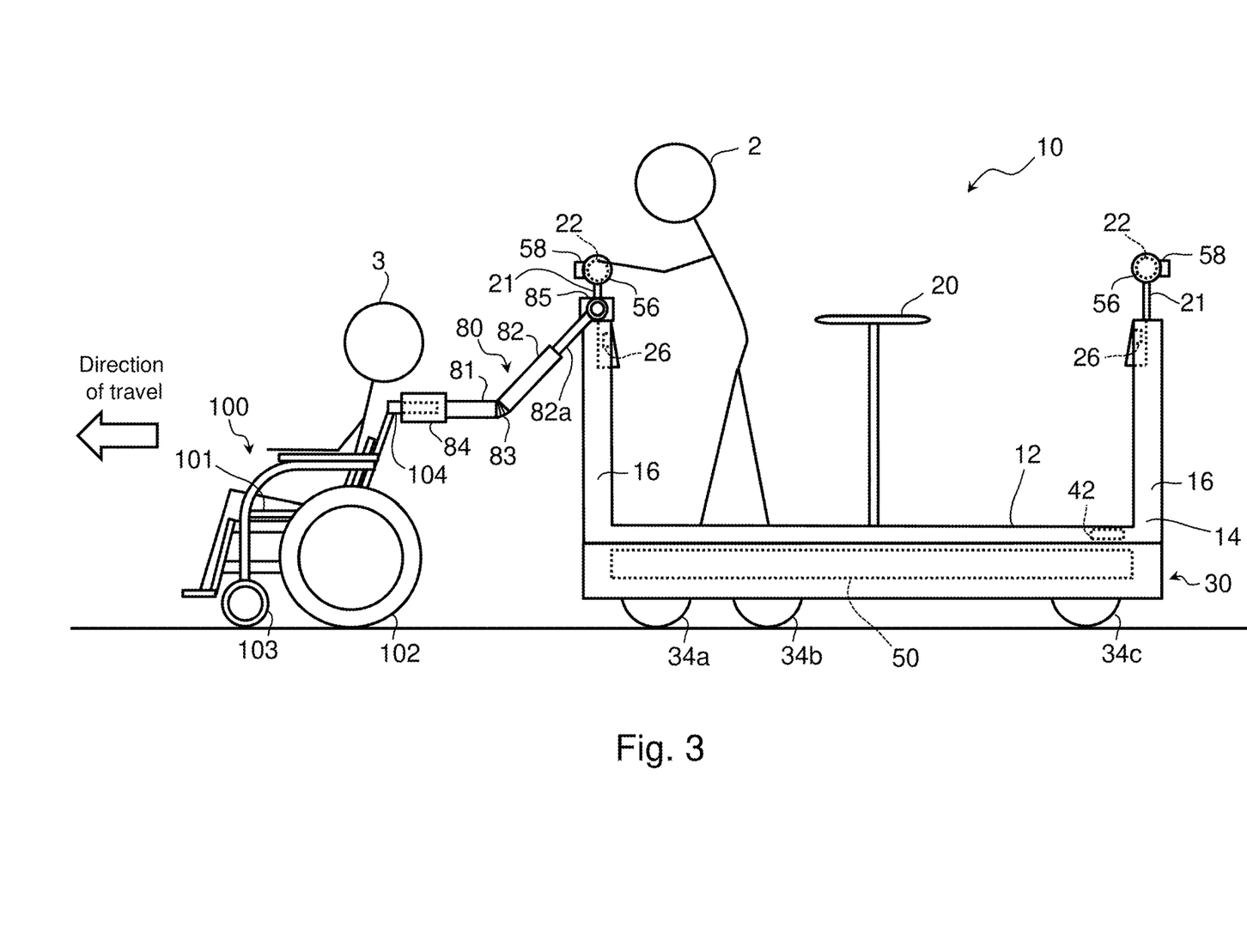
FIG. 3 is a side view showing a state in which an attendant is on board the automatic traveling cart and a user is on the wheelchair shown in FIG. 1.
Figure 4:
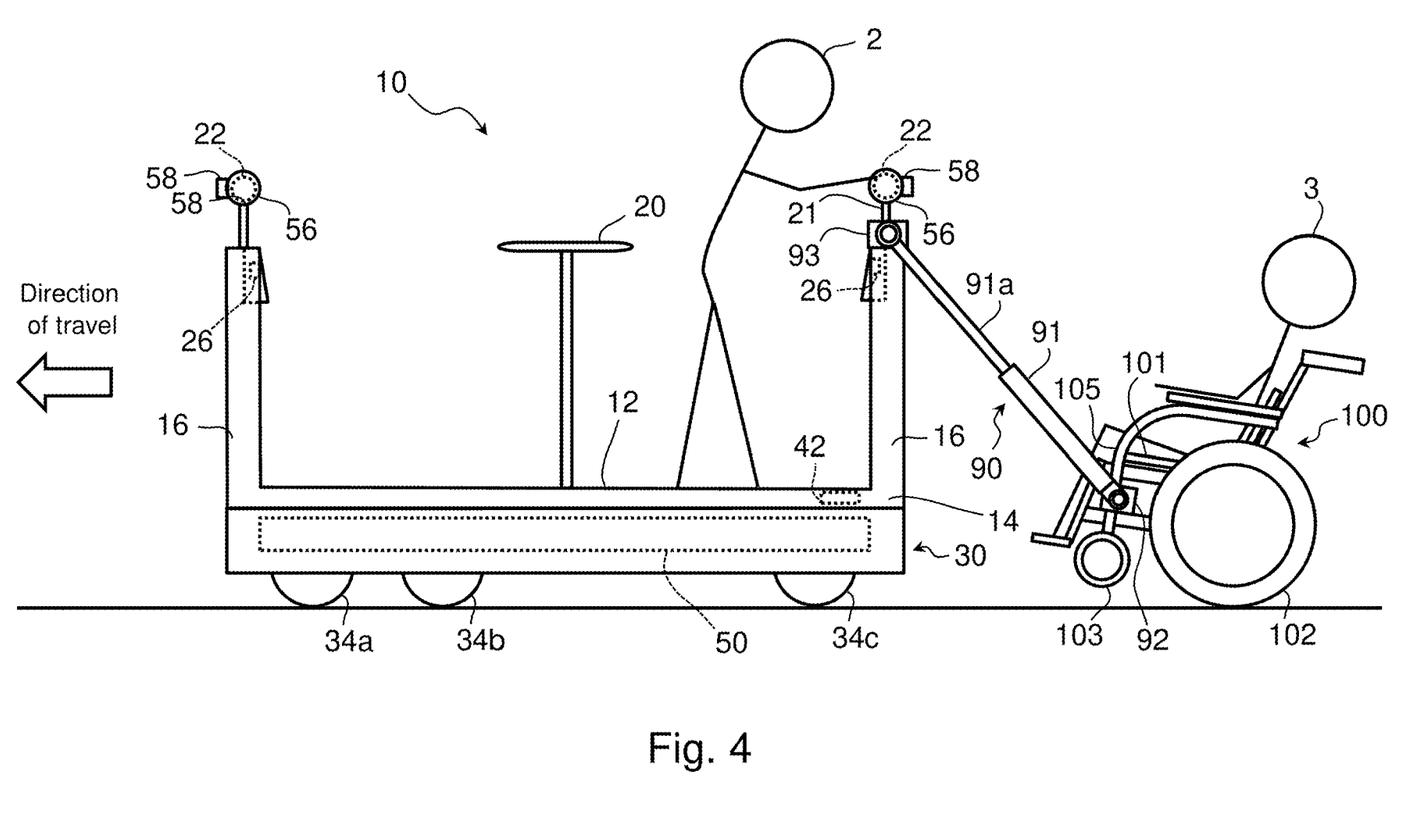
FIG. 4 is a side view showing a state in which an attendant is on board the automatic traveling cart and the user is on the wheelchair shown in FIG. 2.

FIGS. 1 to 4 show a structure of an automatic traveling cart 10 according to an embodiment of the present disclosure. FIGS. 1 and 2 are perspective views of an automatic traveling cart 10, and FIGS. 3 and 4 are side views of an automatic traveling cart 10. The automatic traveling cart 10 is an automatic traveling cart having a pallet-type vehicle body 14. Therefore, in the following description, the automatic traveling cart 10 is referred to as an automatic traveling pallet 10. The automatic traveling pallet 10 may transport a person, a baggage, or both. The automatic traveling pallet 10 may include a human flow application which carries the person, a physical distribution application, and a patrol application. The present disclosure is applicable to automatic traveling pallets 10 of any application. The automatic traveling pallet 10 according to the present embodiment is an automatic traveling pallet 10 for human flow applications.

The automatic traveling pallet 10 is a low-floor vehicle whose height of a deck 12 of the vehicle body 14 is about 30 cm from the ground. The deck 12 is a riding surface on which a user or an attendant rides. The user may stand or sit on the deck 12. Since the automatic traveling pallet 10 is a small vehicle that is expected to be used by a small number of people, it is assumed that about four people will be used as the number of users who can ride on the deck 12 at a time.

The vehicle body 14 is mounted on a chassis unit 30. The structure relating to the traveling of the automatic traveling pallet 10 is housed in the chassis unit 30. The chassis unit 30 has three wheels 34a, 34b, and 34c on the left and three wheels 34a, 34b, and 34c on the right. These wheels 34a, 34b, 34c can travel the automatic traveling pallet 10 in either direction of the left and right in FIGS. 1 and 2. Here, the leftward direction is a basic traveling direction of the automatic traveling pallet 10 as indicated by an arrow in the drawing. Then, the traveling direction is defined as the front of the automatic traveling pallet 10, the opposite direction is defined as the rear of the automatic traveling pallet 10.

In the automatic traveling pallet 10, the configuration of the riding space above the deck 12 can be freely selected. In the example shown in FIGS. 1 to 4, struts 16 are provided at the four corners of the deck 12. Each strut 16 stands upright from the deck 12. The strut 16 may be integrally formed with the vehicle body 14 or may be separate from the vehicle body 14. A backrest 18 is mounted between the front left and right struts 16. Similarly, a backrest 18 is also mounted between the rear left and right struts 16. A removable table 20 is attached to a central of the deck 12. Further, the automatic traveling pallet 10 is provided with a handrail 22 above both of the front and rear backrest 18. The handrail 22 is fixed to the left and right struts 16 by a rigid left and right metal bars 21. Also, an emergency button 26 for emergency stop is installed on each of the four struts 16.

As one feature of the automatic traveling pallet 10, the automatic traveling pallet 10 may couple with the wheelchair 100. When a user 3 of the wheelchair 100 and an attendant 2 wish to move together, as shown in FIGS. 3 and 4, it is very convenient to be able to connect the wheelchair 100 to the automatic traveling pallet 10. For example, when the attendant 2 is an elderly person, pushing the wheelchair 100 is a very difficult task. Even if the wheelchair 100 is electrically powered and it is not necessary to push the wheelchair 100, it is also difficult for the elderly to walk in accordance with the speed of the motorized wheelchair 100. However, according to the automatic traveling pallet 10 to which the wheelchair 100 can be connected, the user of the wheelchair 100 can move by the driving force of the automatic traveling pallet 10 while riding on the wheelchair 100. The attendant 2 can comfortably attend the user 3 of the wheelchair 100 by riding on the automatic traveling pallet 10.

Wheelchair 100 can also be connected to a front portion of the automatic traveling pallet 10 as shown in FIG. 1, and can also be connected to a rear portion of the automatic traveling pallet 10 as shown in FIG. 2. FIG. 3 shows a state in which the attendant 2 stands on the automatic traveling pallet 10 and the user 3 sits on the seat 101 of the wheelchair 100 in the connection form of the automatic traveling pallet 10 and the wheelchair 100 shown in FIG. 1. FIG. 4 shows a state in which the attendant 2 stands on the automatic traveling pallet 10 and the user 3 sits on the seat 101 of the wheelchair 100 in the connection form of the automatic traveling pallet 10 and the wheelchair 100 shown in FIG. 2. If the wheelchair 100 is connected to the front portion or the rear portion of the automatic traveling cart 10 in these ways, the wheelchair 100 does not need to be intentionally placed on the deck 12 in order to carry the wheelchair 100. In addition, it is possible to carry the wheelchair 100 together with the user 3 while the user 3 sits on the seat 101 of the wheelchair 100. Hereinafter will be described a structure for connecting the wheelchair 100 to the automatic traveling pallet 10.

When connecting the wheelchair 100 to the front of the automatic traveling pallet 10, a pair of connecting arms 80 shown in FIGS. 1 and 3 are used. The connecting arms 80 connect the wheelchair 100 in a state of directing the wheelchair 100 in the traveling direction of the automatic traveling pallet 10 to the front of the automatic traveling pallet 10. Specifically, the connecting arms 80 connect the left and right handles 104 of the wheelchair 100, and the left and right metal bars 21 for fixing the handrails 22 on the front side of the automatic traveling pallet 10.

The connecting arms 80 have a structure simulating a human arm. Specifically, each of the connecting arms 80 includes a fixture 84 for the wheelchair 100, a forearm 81, a joint 83, an upper arm 82, and a fixture 85 for the automatic traveling pallet 10. Each fixture 84 is a component for securing the connecting arm 80 to the handle 104 by gripping the handle 104 of the wheelchair 100. Each fixture 84 is configured to be able to grip handles 104 of various sizes. Each forearm 81 extends from the fixture 84 and is fixed relative to the fixture 84. Each joint 83 is a component for connecting the forearm 81 and the upper arm 82. Each joint 83 has a locking mechanism for fixing an angle between the forearm 81 and the upper arm 82. Each upper arm 82 is a shock absorber having a piston rod 82a which expands and contracts in response to an input. Each fixture 85 is a component which is fixed to the metal bar 21 of the automatic traveling pallet 10. Each fixture 85 rotatably supports the piston rod 82a in a vertical plane parallel to the traveling direction of the automatic traveling pallet 10.

By the connecting arms 80 having the above configuration, the wheelchair 100 is restricted from changing a position in the longitudinal direction and the lateral direction relative to the automatic traveling pallet 10. On the other hand, a change in a vertical position of the wheelchair 100 with respect to the automatic traveling pallet 10 is allowed by the rotation of the piston rod 82a with respect to the fixture 85. The absorption of shock by the upper arm 82, which is a shock absorber, and the allowance of changes in position in the vertical direction reduce the shock applied to the user 3 in the wheelchair 100 when the wheelchair 100 passes over a level difference of the road. The wheelchair 100 includes drive wheels 102 and casters 103. Although both the drive wheels 102 and the casters 103 of the wheelchair 100 in FIG. 3 are grounded, the angle of the joint 83 may be adjusted so that only the drive wheels 102 are grounded.

In the example shown in FIG. 3, the attendant 2 grabs the handrail 22 on the front side and stands behind the user 3 seated in the wheelchair 100. When the wheelchair 100 is connected to the front portion of the automatic traveling pallet 10, the attendant 2 and the user 3 of the wheelchair 100 can enjoy conversation with each other in such a posture. Further, when some emergency occurs in the wheelchair 100 and the user 3, the attendant 2 can perform an emergency stop of the automatic traveling pallet 10 by pressing one of the emergency buttons 26.

When connecting the wheelchair 100 to the rear of the automatic traveling pallet 10, a pair of connecting arms 90 shown in FIGS. 2 and 4 are used. The connecting arms 90 connect the wheelchair 100 in a state of directing the wheelchair 100 in the traveling direction of the automatic traveling pallet 10 to the rear of the automatic traveling pallet 10. Specifically, the connecting arms 90 connect the left and right frames 105 of the wheelchair 100, and the left and right metal bars 21 for fixing the handrails 22 on the rear side of the automatic traveling pallet 10.

Each connecting arm 90 is composed of a fixture 92 for the wheelchair 100, a shock absorber 91 having a piston rod 91a which expands and contracts in response to an input, and a fixture 93 for the automatic traveling pallet 10. Each fixture 92 is a component that is fixed to the frame 105 of the wheelchair 100. Each fixture 92 is configured to be secured to frames 105 of various thicknesses. Each fixture 92 rotatably supports the piston rod 91a in a vertical plane parallel to the traveling direction of the automatic traveling pallet 10. Each fixture 93 is a component which is fixed to the metal bars 21 of the automatic traveling pallet 10. Each fixture 93 rotatably supports the shock absorber 91 in a vertical plane parallel to the traveling direction of the automatic traveling pallet 10.

By the connecting arms 90 having the above configuration, the wheelchair 100 is restricted from changing the position in the longitudinal direction and the lateral direction relative to the automatic traveling pallet 10. On the other hand, the change in the vertical position of the wheelchair 100 with respect to the automatic traveling pallet 10 is allowed by the rotation of the piston rod 91a with respect to the fixture 93 and the rotation of the shock absorber 91 with respect to the fixture 92. The absorption of the shock by the shock absorber 91 and the allowance of the change of the position in the vertical direction reduce the shock applied to the user 3 in the wheelchair 100 when the wheelchair 100 crosses a step of the road. Although only the drive wheels 102 of the wheelchair 100 are grounded in FIG. 4, a mounting position of the fixture 92 may be adjusted so that both the drive wheels 102 and the casters 103 are grounded.

In the example shown in FIG. 4, the attendant 2 grabs the rear handrail 22 and stands facing the user 3 seated in the wheelchair 100. When the wheelchair 100 is connected to the rear portion of the automatic traveling pallet 10, the attendant 2 and the user 3 of the wheelchair 100 can enjoy conversation with each other in such a posture. It can be said that such an enjoyment in which the attendant 2 faces rearward is a characteristic of the automatic traveling pallet 10 that travels autonomously. Further, when some emergency occurs in the wheelchair 100 and the user 3, the attendant 2 can perform an emergency stop of the automatic traveling pallet 10 by pressing one of the emergency buttons 26.

Figure 5:
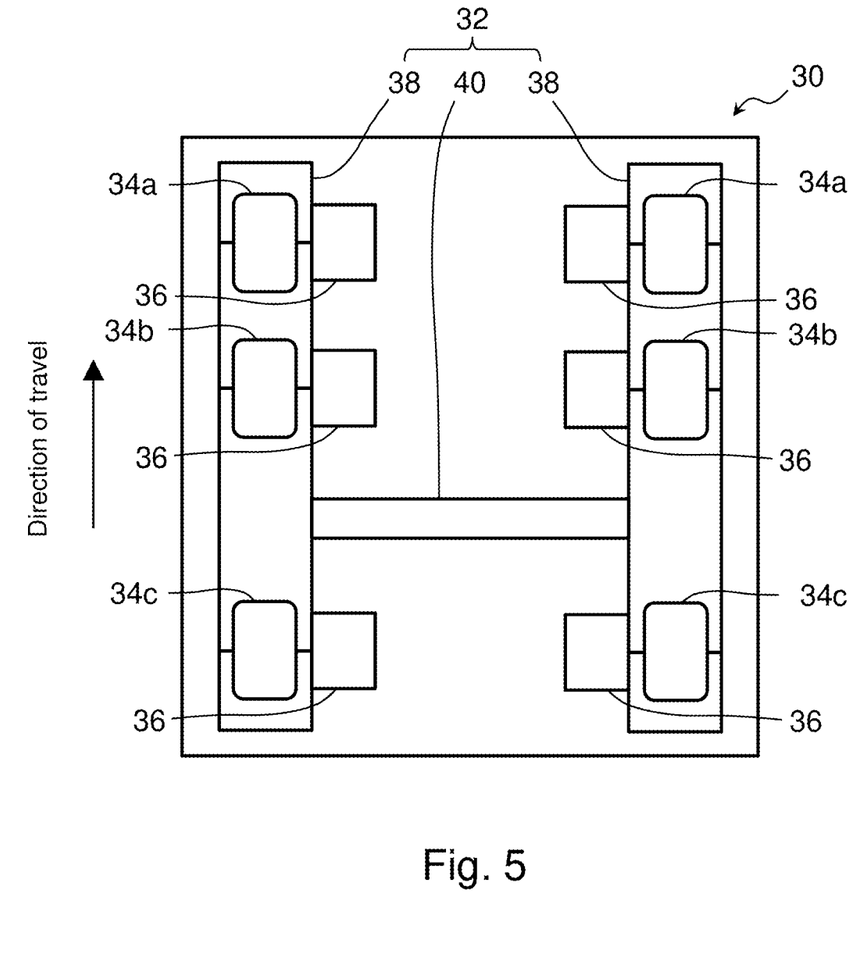
FIG. 5 is a diagram showing a configuration of a chassis unit of the automatic traveling cart shown in FIGS. 1 and 2.

The description to be performed next is for the details of the chassis unit 30 of the automatic traveling pallet 10. FIG. 5 is a plan view showing the configuration of the chassis unit 30. The chassis unit 30 includes a frame 32, wheels 34a, 34b, and 34c, and electric motors 36. The wheels 34a, 34b, 34c are arranged symmetrically with three on each of the left and right of the chassis unit 30. The central wheels 34b are wheels of common structure in which tires are incorporated. The wheels 34a of the front end and the wheels 34c of the rear end are omni-wheels capable of movement in all directions. The electric motors 36 are provided for each wheels 34a, 34b, 34c to drive each wheel 34a, 34b, 34c independently. The frame 32 includes left and right main members 38 and a sub-member 40 connecting the left and right main members 38. The wheels 34a, 34b, 34c on the left and the three electric motors 36 for driving them are fixed to the left main member 38. Similarly, the wheels 34a, 34b, 34c on the right and the three electric motors 36 for driving them are fixed to the right main member 38.

Acceleration and deceleration of the automatic traveling pallet 10 is performed by the control of the electric motors 36. Further, the regenerative brake under the control of the electric motors 36 is utilized for braking the automatic traveling pallet 10. However, a mechanical brake may be provided on the central wheels 34b, which is a normal wheel. Turning of the automatic traveling pallet 10 is performed by providing a difference between the rotation speed of the left three wheels 34a, 34b, 34c and the rotation speed of the right three wheels 34a, 34b, 34c. Further, by independently controlling the rotational speed for each of the wheels 34a, 34b, 34c, it is possible to realize the turning of various aspects, for example, large turning, small turning, turning to cause the outer wheel difference, turning to cause the inner wheel difference, and turning to cause neither the outer wheel difference nor the inner wheel difference, etc.

The description of the configuration of the automatic traveling pallet 10 will return to the description with reference to FIGS. 1 to 4. The automatic traveling pallet 10 is provided with external sensors for automatic traveling. The automatic traveling pallet 10 may include a LiDAR (Laser Imaging Detection and Ranging) 58. The LiDAR 58 is provided on the outside of the respective handrails 22 so as to respectively sense the front and rear of the automatic traveling pallet 10. The automatic traveling pallet 10 may include a camera 56. The camera 56 is provided at both ends of each handrail 22 so as to photograph the right front, left front, right rear, and left rear of the automatic traveling pallet 10. The LiDAR 58 and the cameras 56 are installed at a height at which sensing is not obstructed by the user 3 who rides on the wheelchair 100 when the wheelchair 100 is connected to the automatic traveling pallet 10.

The automatic traveling pallet 10 is provided with a switch 42 for switching the turning mode of the automatic traveling pallet 10. The turning mode includes a non-connection mode in which the wheelchair 100 is not coupled to the automatic traveling pallet 10, a front connection mode in which the wheelchair 100 is coupled to the front portion of the automatic traveling pallet 10, and a rear connection mode in which the wheelchair 100 is coupled to the rear portion of the automatic traveling pallet 10. Details of each turning mode will be explained in the following. The switch 42 is located under the deck 12 and is usually hidden by a lid 44.

Figure 6:
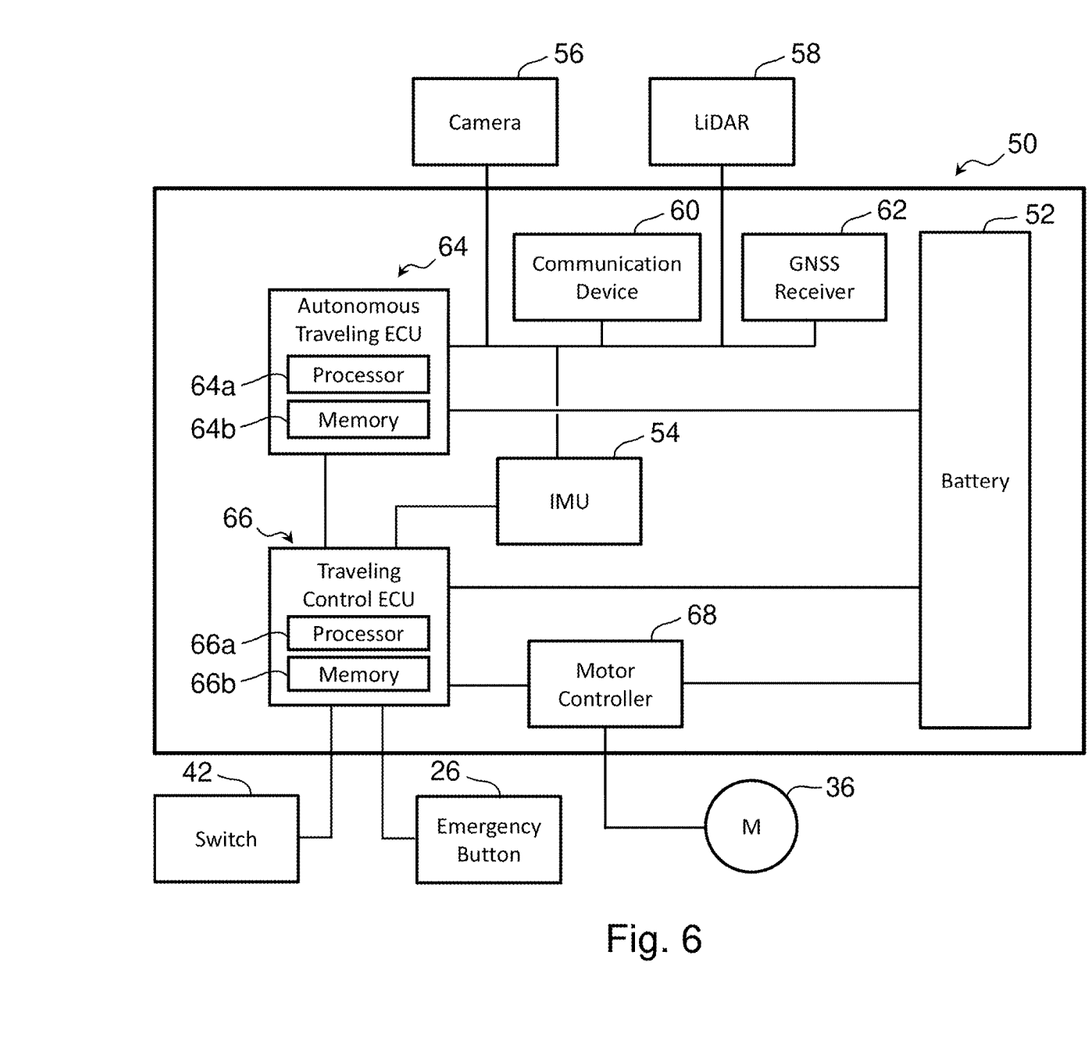
FIG. 6 is a block diagram showing a configuration of a control unit mounted on the automatic traveling cart shown in FIGS. 1 and 2.

The description to be performed next is for the details of a control unit 50 of the automatic traveling pallet 10. FIG. 6 is a block diagram showing a configuration of the control unit 50 mounted on the automatic traveling pallet 10. The control unit 50 includes an autonomous traveling ECU (Electronic Control Unit) 64, a traveling control ECU 66, a battery 52, an IMU (Inertial Measurement Unit) 54, a communication device 60, a GNSS (Global Navigation Satellite System) receiver 62, and a motor controller 68. Each of the autonomous traveling ECU 64 and the traveling control ECU 66 includes memories 64b, 66b including at least one program and processors 64a, 66a coupled to the memories 64b, 66b. Each of the autonomous traveling ECU 64 and the traveling control ECU may have a plurality of memories and a plurality of processors, respectively.

The autonomous traveling ECU 64 controls the autonomous traveling of the automatic traveling pallet 10. The LiDAR 56 and the cameras 58 installed in the vehicle body 14 are connected to the autonomous traveling ECU 64. The LiDAR 56 is used for detection and ranging of objects existing around the automatic traveling pallet 10. The camera 58 is used to recognize objects that exist around the automatic traveling pallet 10. Furthermore, the IMU 54, the communication device 60 and the GNSS receiver 62 are connected to the autonomous traveling ECU 64. The IMU 54 is used for the measurement of angular velocity and acceleration of three axes. According to the IMU 54, the velocity, acceleration, and attitude of the automatic traveling pallet 10 can be acquired. The IMU 54 transmits the acquired data to the autonomous traveling ECU 64 and the traveling control ECU 66. The communication device 60 is used for vehicle-to-vehicle communication and road-to-vehicle communication utilizing the 920 MHz band. The GNSS receiver 62 is used for signal-based self-position estimation from GNSS satellites.

Further, the autonomous traveling ECU 64 has a function of communicating with a management server 70, which will be described later, by mobile communication such as 4G or 5G. The autonomous traveling ECU 64 generates a traveling schedule based on the departure point, the destination, and the reserved time of the user received from the management server. The autonomous traveling ECU 64 inputs the target trajectory calculated from the traveling planning into the traveling control ECU 66. The target trajectory includes a column of points that the automatic traveling pallet 10 follows in the coordinate system, and speed information at each point.

The traveling control ECU 66 generates a motor command value for traveling the automatic traveling pallet 10 along the target track. It is possible to control the traveling direction of the automatic traveling pallet 10 along the target track by appropriately controlling the rotational speed of each of the wheels 34a, 34b, 34c. The motor command value generated by the traveling control ECU 66 is input to the motor controller 68. The motor controller 68 controls each of the motors 36 independently. Each signal of the emergency button 26 and the switch 42 provided on the vehicle body 14 is transmitted to the traveling control ECU 66. If an emergency signal is input from the emergency button 26, the traveling control ECU 66 urgently stops the motors 36. If a switching signal from the switch 42 is input, the traveling control ECU 66 switches the control method of the motors 36 in accordance with the turning mode indicated by the switching signal.

Incidentally, the power supply for driving the motors 36 is supplied from the battery 52 via the motor controller 68. The motor controller 68 controls the power supply to the motors 36 of each of the wheels 34a, 34b, 34c according to the motor command value. The power of the battery 52 is also supplied to the autonomous traveling ECU 64 and the traveling control ECU 66. The LiDAR 56, cameras 58, the IMU 54, the communication device 60, and the GNSS receiver 62 are supplied with power from the autonomous travel ECU 64.

Figure 7:
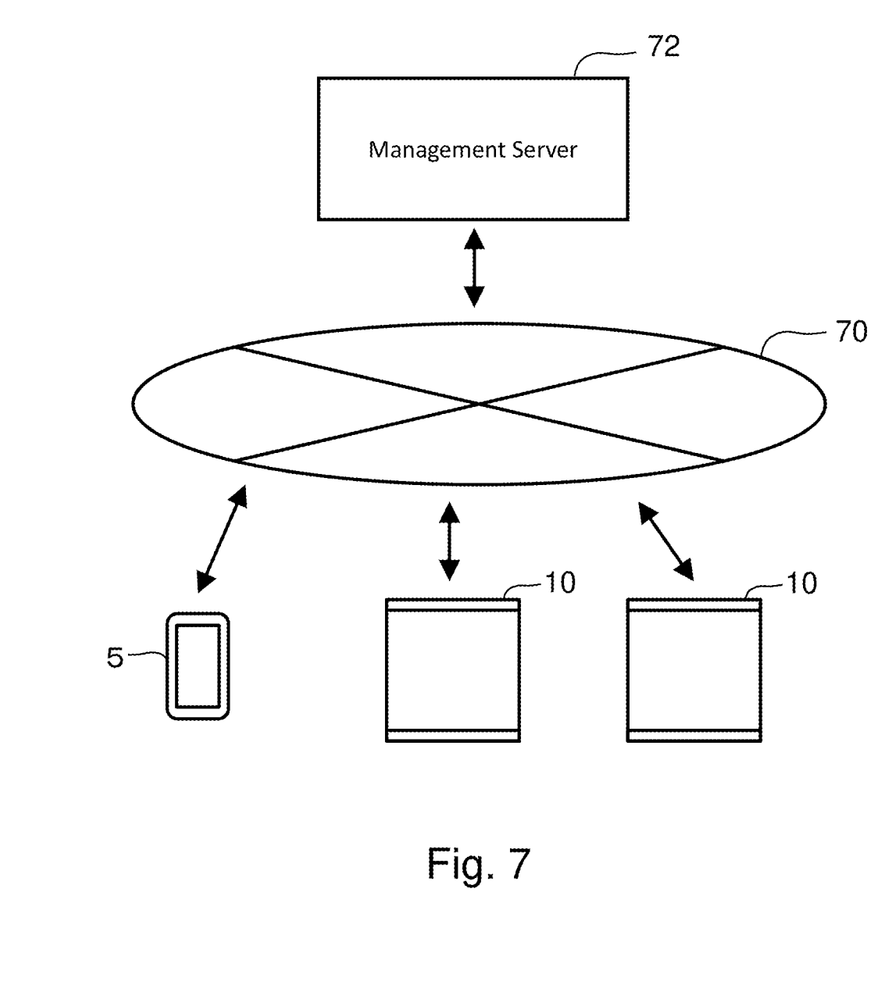
FIG. 7 is a diagram for explaining a method of using the automatic traveling cart.

Next, the method of using the automatic traveling pallet 10 will be described. As shown in FIG. 7, the automatic traveling pallet 10 is connected to the management server 72 via a wireless communication network 70. The user of the automatic traveling pallet 10 communicates with the management server 72 using a user terminal 5 such as a smartphone or a tablet PC. The user of the automatic traveling pallet 10 can transmit a desired departure point, a destination, and a desired departure time to the management server 72. The management server 72 selects an appropriate automatic traveling pallet 10 from a plurality of available automatic traveling pallets 10. The available automatic traveling pallet 10 is an empty automatic traveling pallet 10, and an automatic traveling pallet 10 with a margin in the number of passengers. The management server 72 transmits the departure point, the destination, and the departure time to the selected automatic traveling pallet 10.

When the user of the automatic traveling pallet 10 is the user 3 of the wheelchair 100, the user 3 of the wheelchair 100 can reserve the automatic traveling pallet 10 capable of connecting the wheelchair 100 from the management server 72. On the reservation screen of the user terminal 5, it is possible to select whether the wheelchair 100 is to be connected to the front of the automatic traveling pallet 10 or to be connected to the rear of the automatic traveling pallet 10. If the user 3 of the wheelchair 100 selects the front connection, the automatic traveling pallet 10 attached to the connecting arms 80 (refer to FIGS. 1 and 3) is reserved. If the user 3 of the wheelchair 100 selects the rear connection, the automatic traveling pallet 10 attached to the connecting arms 90 (refer to FIGS. 2 and 4) is reserved. The management server 72 that has received reservations from the user 3 of the wheelchair 100 instructs the attendant 2 to install the connecting arms 80 or the connecting arms 90 to the automatic traveling pallet 10. Alternatively, for the user 3 of the wheelchair 100, a certain number of automatic traveling pallets 10 may be prepared in a state in which the connecting arms 80 or the connecting arms 90 is mounted in advance.

The automatic traveling pallet 10 arrives at the user 3 of the wheelchair 100 in a state in which the connecting arms 80 or the connecting arms 90 are pre-attached. Attachment of the connecting arms 80, 90 to the wheelchair 100 is performed by the attendant 2 attending the user 3 of the wheelchair 100. The user 3 of the wheelchair 100 without an attendant 2 can request support by an attendant 2 when reserving the automatic traveling pallet 10. The attendant 2 rides on the reserved automatic traveling pallet 10 and appears at the departure site where the attendant 2 connects the wheelchair 100 to the automatic traveling pallet 10. Then, the attendant 2 moves with the user 3 to the destination riding on the automatic traveling pallet 10, and separates the wheelchair 100 from the automatic traveling pallet 10 at the destination. Further, the attendant 2, at the time of departure, in accordance with the connection mode of the wheelchair 100 to the automatic traveling pallet 10, performs switching of the turning mode by the witch 42.

The description to be performed next is for details of the turning mode of the automatic traveling pallet 10. As described above, the automatic traveling pallet 10 has the un-connection mode as a turning mode, the front connection mode as a turning mode, and the rear connection mode as a turning mode. A state in which the wheelchair 100 is not connected to the automatic traveling pallet 10 is a normal state of the automatic traveling pallet 10. Therefore, the un-connection mode is the basic turning mode of the automatic traveling pallet 10. By the operation of the switch 42, any one of these three turning modes is selected.

Figure 8:
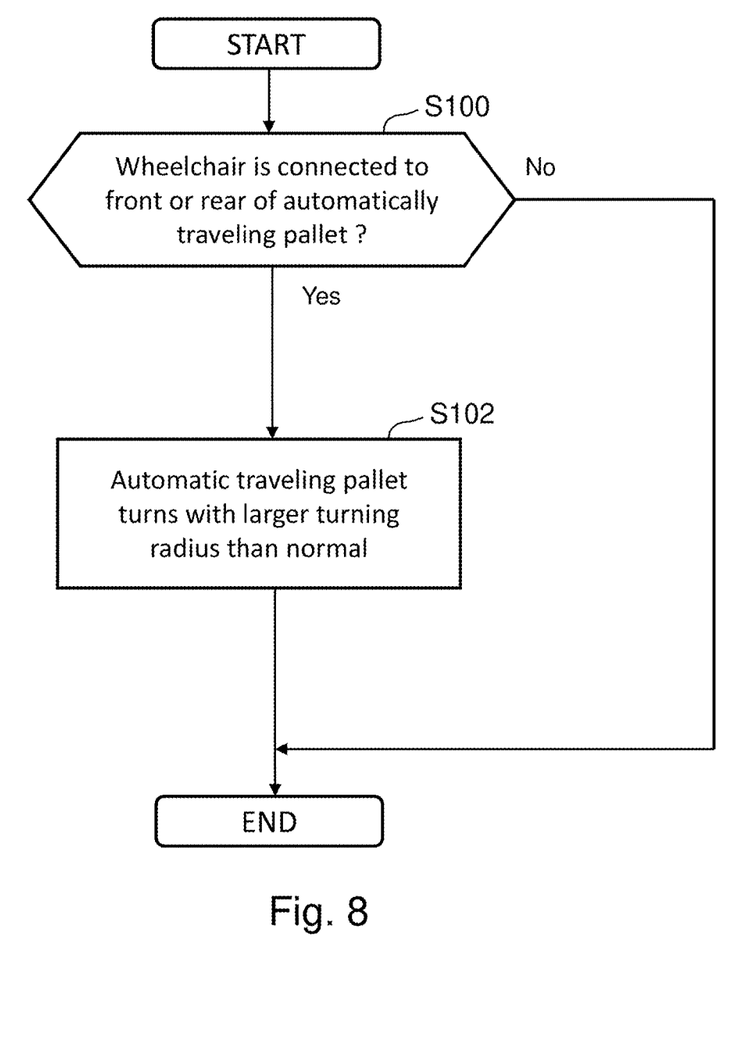
FIG. 8 is a flowchart showing a determination of a switching of a turning radius of the automatic traveling cart according to a presence or absence of a connection of the wheelchair.

FIG. 8 is a flowchart showing the determination of the switching of the turning radius of the automatic traveling pallet 10 according to the presence or absence of the connection of the wheelchair 100. In the determination of the switching of the turning radius, first, it is determined whether the wheelchair 100 is connected to the front or rear of the automatic traveling pallet 10 (step S100). If the wheelchair 100 is not coupled to the automatic traveling pallet 10, the turning radius in the un-connection mode is maintained as usual. Since the front wheel 34a and rear wheel 34c of the automatic traveling pallet 10 are omni-wheels, the automatic traveling pallet 10 is capable of turning at a small turning radius.

When the wheelchair 100 is coupled to the automatic traveling pallet 10, the front connection mode or the rear connection mode is selected. In this case, regardless of the front connection mode or the rear connection mode, so as to turn the automatic traveling pallet 10 with a larger turning radius than normal (step S102), the rotation speed of each of the motors 36 is controlled. When turning the automatic traveling pallet 10 at too small a turning radius, excessive centrifugal force is applied to the user 3 in the wheelchair 100, thereby placing a burden on the user 3. Therefore, when the wheelchair 100 is connected to the automatic traveling pallet 10, the turning radius of the automatic traveling pallet 10 is maintained at a predetermined value or more.

Figure 9:
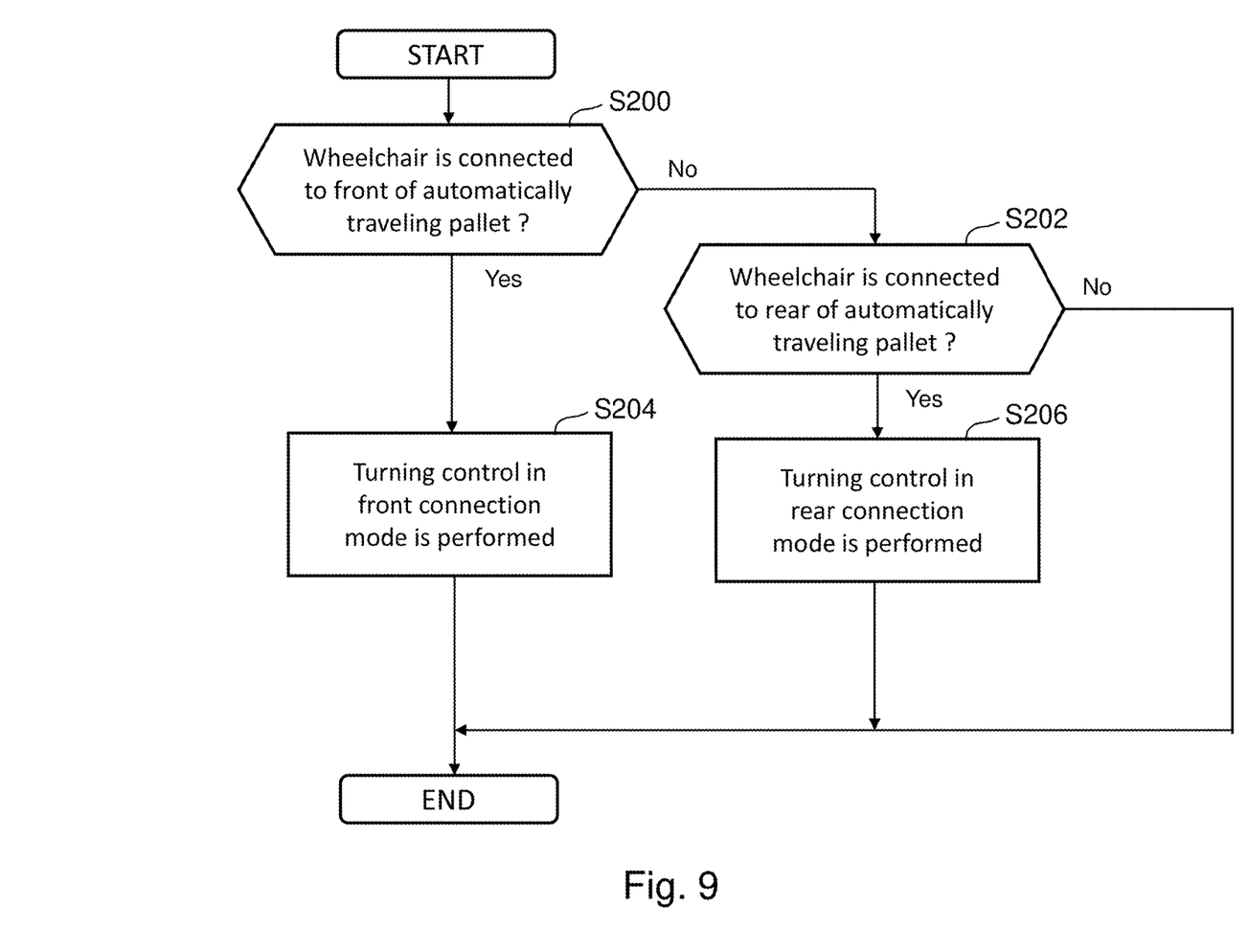
FIG. 9 is a flowchart showing a determination of the switching of a turning mode of the automatic traveling cart according to a connection mode of the wheelchair.

FIG. 9 is a flowchart showing the determination of the switching of the turning mode of the automatic traveling pallet 10 according to the connection form of the wheelchair 100. In the determination of the turning mode switching, it is determined whether the wheelchair 100 is connected to the front of the automatic traveling pallet 10 (step S200). Further, if the wheelchair 100 is not connected to the front of the automatic traveling pallet 10 (No in step S200) it is determined whether the wheelchair 100 is connected to the rear of the automatic traveling pallet 10 (step S202). If the wheelchair 100 is not coupled to the automatic traveling pallet 10 (No in step 202), the un-connection mode is maintained as usual. In the un-connection mode, the rotation speed of each motor 36 is controlled so as to perform the turning without causing the outer wheel difference or the inner wheel difference.

Figure 10:
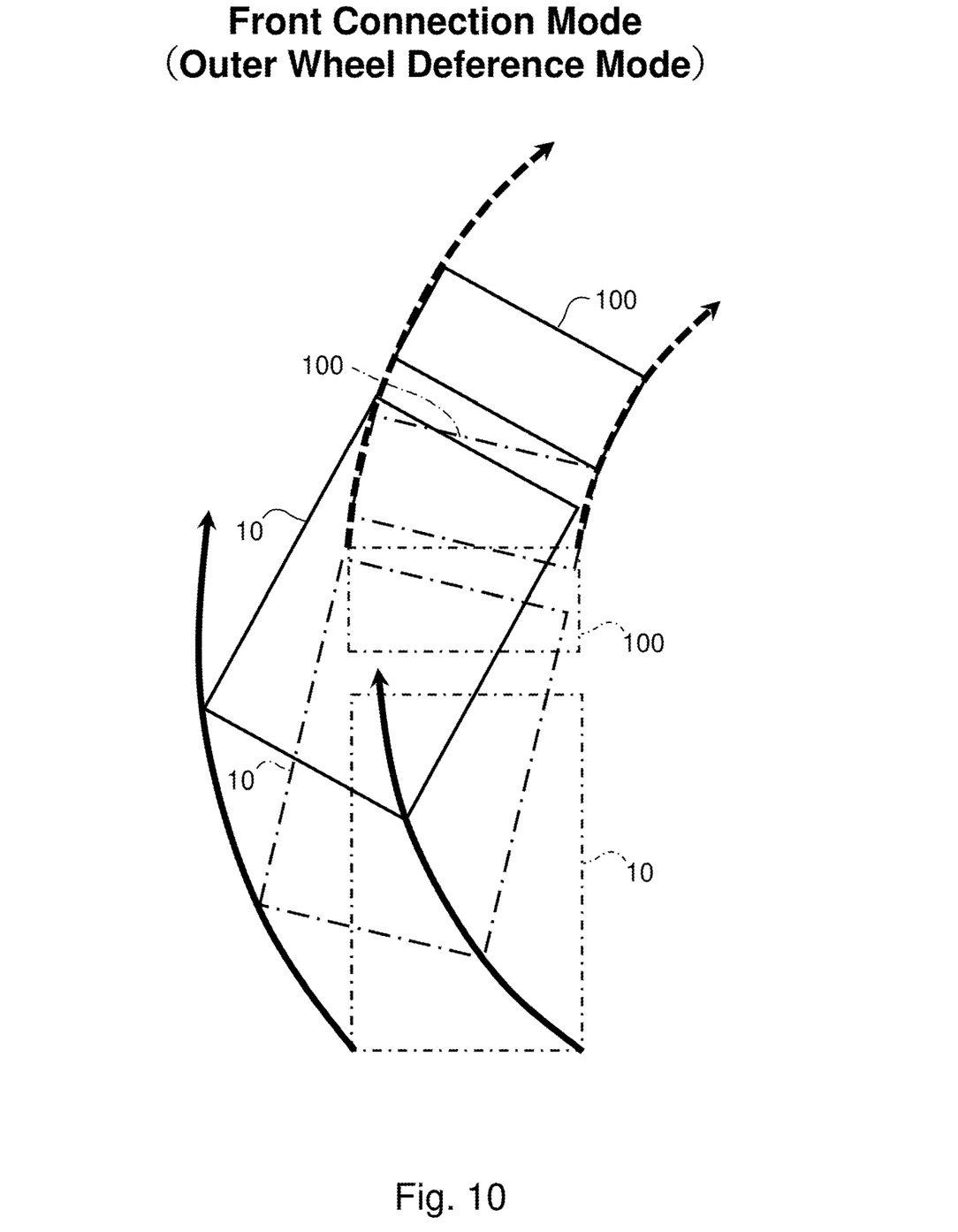
FIG. 10 is a diagram showing an operation at a time of turning of the automatic traveling cart in a front connection mode.

When the wheelchair 100 is connected to the front of the automatic traveling pallet 10 (Yes in step S200), the turning control in the front connection mode is performed (step S204). In the front connection mode, the rotation speed of each motor 36 is controlled so as to perform the rotation in which the outer wheel difference occurs. Specifically, as shown in FIG. 10, it is performed to change the traveling track of the automatic traveling pallet 10 so that the outer rear wheel 34c draws a track more outward than the outer front wheel 34a. The behavior of such an automatic traveling pallet 10, to reduce the rotational speed difference between the outer front wheel 34a and the inner front wheel 34a, can be realized by increasing the rotational speed difference between the outer rear wheel 34c and the inner rear wheel 34c. According to the front connection mode, when turning, it is possible to suppress the abrupt behavior occurs in the wheelchair 100 which is connected to the front of the automatic traveling pallet 10.

Figure 11:
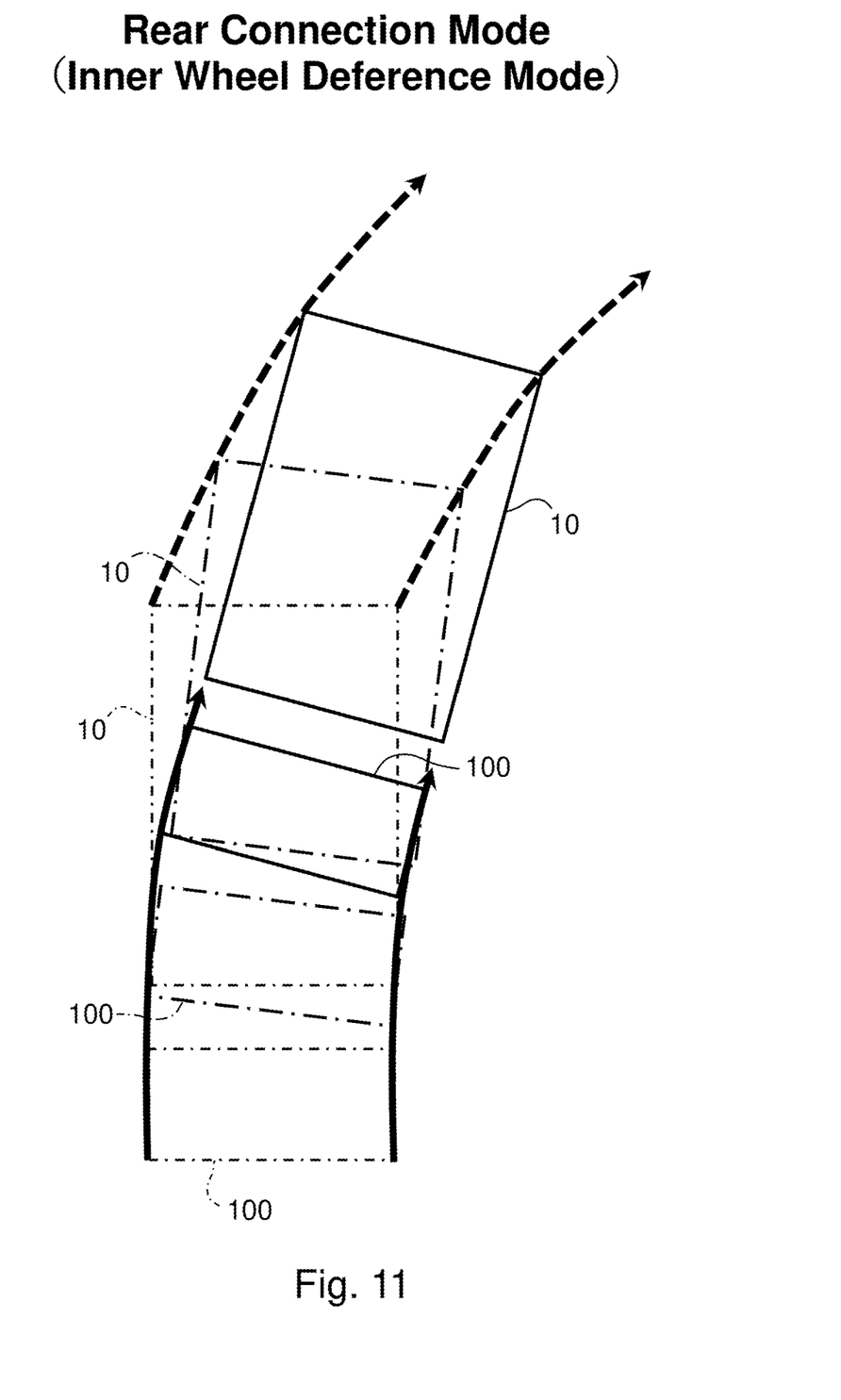
FIG. 11 is a diagram showing an operation at a time of turning of the automatic traveling cart in a rear connection mode.

When the wheelchair 100 is connected to the rear of the automatic traveling pallet 10 (Yes in step S202), the turning control in the rear connection mode is performed (step S206). In the rear connection mode, the rotation speed of each motor 36 is controlled so as to perform the rotation in which the inner wheel difference occurs. Specifically, as shown in FIG. 11, it is performed to change the traveling track of the automatic traveling pallet 10 so that the inner rear wheel 34c draws a track more inward than the inner front wheel 34a. The behavior of such an automatic traveling pallet 10, to reduce the rotational speed difference between the outer rear wheel 34c and the inner rear wheel 34c, can be realized by increasing the rotational speed difference between the outer front wheel 34a and the inner front wheel 34a. According to the rear connection mode, when turning, it is possible to suppress the abrupt behavior occurs in the wheelchair 100 which is connected to the rear of the automatic traveling pallet 10.

Finally, a modification of the automatic traveling pallet 10 described above will be described. As one modification, the central wheel 34b may be removed and the front wheels 34a and the rear wheels 34c may be changed from omni-wheels to mecanum-wheels.

As another modification, it may be detected by a sensor that the connecting arms 80 or the connecting arms 90 are attached to the automatic traveling pallet 10. Then, the turning mode may be automatically switched according to the detection result by the sensor.

As a method of using the automatic traveling pallet 10, there is also a method of utilizing other than connecting the wheelchair 100 to the front or rear of the automatic traveling pallet 10. For example, the wheelchair 100 may be fixed sandwiched between both sides with two automatic traveling pallets 10, and the wheelchair 100 may be carried in that state. In the curve, it is possible to turn a curve by varying the driving force of the left and right automatic traveling pallets 10. Even if the individual automatic traveling pallets 10 are not sufficiently equipped with torque vectoring functions, such use can smoothly carry the wheelchair 100 along the curve.

What is claimed is:

1. An automatic traveling cart comprising:
a connecting arm that connects a wheelchair to a front portion or a rear portion of the automatic traveling cart, and the connecting arm maintains contact of the wheelchair with ground as the automatic traveling cart moves the wheelchair, the connecting arm includes a fixture configured to secure the connecting arm to a handle of the wheelchair and a shock absorber having a piston rod that expands and contracts to allow vertical movement between the automatic traveling cart and wheelchair and maintain contact of the wheelchair with the ground.

2. The automatic traveling cart according to claim 1, wherein the connecting arm allows a change in a vertical position of the wheelchair with respect to the automatic traveling cart.

3. The automatic traveling cart according to claim 1, wherein when the wheelchair is connected to the automatic traveling cart by the connecting arm, a turning radius of the automatic traveling cart is made larger than a turning radius of the automatic traveling cart when the wheelchair is not connected to the automatic traveling cart.

4. The automatic traveling cart according to claim 1, wherein the connecting arm connects the wheelchair to the front portion of the automatic traveling cart in a state in which the wheelchair is directed in a traveling direction of the automatic traveling cart.

5. The automatic traveling cart according to claim 1, wherein the connecting arm connects the wheelchair to the rear portion of the automatic traveling cart in a state in which the wheelchair is directed in a traveling direction of the automatic traveling cart.

6. The automatic traveling cart according to claim 4, wherein the automatic traveling cart changes a traveling track of the automatic traveling cart so that an outer rear wheel in a turning direction of the automatic traveling cart draws a track more outward than an outer front wheel in the turning direction.

7. The automatic traveling cart according to claim 5, wherein the automatic traveling cart changes a traveling track of the automatic traveling cart so that an inner rear wheel in a turning direction of the automatic traveling cart draws a track more inward than an inner front wheel in the turning direction.

8. An automatic traveling cart comprising:
a connecting arm that connects a wheelchair to a front portion or a rear portion of the automatic traveling cart, and the connecting arm maintains contact of the wheelchair with ground as the automatic traveling cart moves the wheelchair, the connecting arm includes a fixture configured to secure the connecting arm to the wheelchair and a shock absorber having a piston rod that expands and contracts to allow vertical movement between the automatic traveling cart and wheelchair and maintain contact of the wheelchair with the ground, the connecting arm includes a forearm and an upper arm connected together by a joint that allows rotational adjustment therebetween, with the joint configured to lock and maintain an angle between the forearm and the upper arm, and the upper arm comprises the piston rod.

* * * * *